United States Patent
Chen et al.

(10) Patent No.: US 9,435,316 B2
(45) Date of Patent: Sep. 6, 2016

(54) WAVE POWER GENERATION SYSTEM AND MOTION CONTROL MODULE THEREOF

(71) Applicant: Industrial Technology Research Institute, Hsin-Chu (TW)

(72) Inventors: Wei-Ming Chen, Hsinchu County (TW); Yi-Chen Li, Hsinchu County (TW); Tzu-Hung Huang, Kaohsiung (TW); Chih-Wei Yen, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 1 day.

(21) Appl. No.: 14/515,944

(22) Filed: Oct. 16, 2014

(65) Prior Publication Data

US 2016/0108884 A1   Apr. 21, 2016

(51) Int. Cl.
| F03B 13/10 | (2006.01) |
| F03B 13/12 | (2006.01) |
| H02P 9/04  | (2006.01) |
| F03B 13/18 | (2006.01) |
| F16D 31/02 | (2006.01) |

(52) U.S. Cl.
CPC .................................. F03B 13/1845 (2013.01)

(58) Field of Classification Search
USPC ................ 290/53, 54; 60/398, 496, 500
See application file for complete search history.

(56) References Cited

U.S. PATENT DOCUMENTS

| 5,324,988 | A  | * | 6/1994  | Newman ............... F03B 13/148 |
|           |    |   |         | 290/45 |
| 5,909,060 | A  |   | 6/1999  | Gardner |
| 7,168,532 | B2 | * | 1/2007  | Stewart .................. B60L 7/003 |
|           |    |   |         | 188/161 |
| 7,310,944 | B2 | * | 12/2007 | Sabol ..................... B60L 7/003 |
|           |    |   |         | 60/495 |
| 7,877,994 | B2 |   | 2/2011  | Bull et al. |
| 8,314,506 | B2 |   | 11/2012 | Rhinefrank et al. |
| 8,659,179 | B2 | * | 2/2014  | Rhinefrank ............ F03B 13/20 |
|           |    |   |         | 290/53 |
| 8,955,315 | B2 | * | 2/2015  | Yen ....................... F03B 13/264 |
|           |    |   |         | 415/58.5 |
| 9,169,823 | B2 | * | 10/2015 | Murphree ............... F03B 13/20 |
| 2004/0163389 | A1 | * | 8/2004 | Gerber ................ F03B 13/1845 |
|           |    |   |         | 60/595 |
| 2005/0237775 | A1 | * | 10/2005 | Sabol ..................... B60L 7/003 |
|           |    |   |         | 363/178 |
| 2007/0266704 | A1 | * | 11/2007 | Bull .................... B63B 35/4406 |
|           |    |   |         | 60/398 |
| 2008/0277492 | A1 | * | 11/2008 | Cannon .................. A01G 15/00 |
|           |    |   |         | 239/14.1 |
| 2011/0012358 | A1 |   | 1/2011  | Brewster et al. |

(Continued)

FOREIGN PATENT DOCUMENTS

| CN | 1063828     | 3/2001  |
| CN | 101918703 A | 12/2010 |

(Continued)

OTHER PUBLICATIONS

Finnegan et al., "The Structural Dynamics of a Two-Body Wave Energy Converter", Oct. 2012.

(Continued)

*Primary Examiner* — Pedro J Cuevas
(74) *Attorney, Agent, or Firm* — WPAT, PC; Justin King; Douglas A Hosack

(57) ABSTRACT

A wave power generation system comprises a heavy plate; an expansion pipe installed on a top of the heavy plate; a motion module installing on a top of the expansion pipe; a buoy installing on a top of the motion module, a top end of the motion module through the buoy and the top end connected to the buoy; and a motion control module having a base installing in the heavy plate; a driving unit installed in the base; and multiple blades coupled to the driving unit.

6 Claims, 6 Drawing Sheets

(56) References Cited

U.S. PATENT DOCUMENTS

| | | | |
|---|---|---|---|
| 2012/0247096 A1 | 10/2012 | Gerber et al. | |
| 2012/0248778 A1* | 10/2012 | Yen | F03B 13/264 290/54 |
| 2012/0267949 A1 | 10/2012 | Sharon et al. | |
| 2014/0097620 A1* | 4/2014 | Harari | F03B 17/067 290/54 |
| 2014/0116042 A1* | 5/2014 | Lo | F03B 13/16 60/500 |
| 2015/0176562 A1* | 6/2015 | Nozawa | F03B 13/186 290/53 |

FOREIGN PATENT DOCUMENTS

| | | |
|---|---|---|
| JP | 2011-21559 A | 2/2011 |
| TW | 595650 | 6/2004 |
| TW | 201026949 | 7/2010 |
| TW | M415207 | 11/2011 |
| TW | 201319386 A | 5/2013 |

OTHER PUBLICATIONS

Elwood et al., "Design, construction, and ocean testing of a taut-moored dual-body wave energy converter with a linear generator power take-off", Apr. 2009.

Wu et al., "Response and conversion efficiency of two degrees of freedom wave energy device", Dec. 2013.

Antonio F. de O. Falcao et al., "Phase control through load control of oscillating-body wave energy converters with hydraulic PTO system", Oct. 2007.

Pedro C.Vicente et al., "Nonlinear dynamicsofatightlymooredpoint-absorberwave energy converter", Jan. 2013.

Gary Nolan and John Ringwood, "Control of a Heaving Buoy Wave Energy Converter for Potable Water Production", Jun. 2006.

Taiwan Intellectual Property Office, "Notice of Allowance", issued on Jun. 22, 2016.

\* cited by examiner

WAVE POWER GENERATION SYSTEM AND MOTION CONTROL MODULE THEREOF

CROSS REFERENCE TO RELATED APPLICATION

This application also claims priority to Taiwan Patent Application No. 103123487 filed in the Taiwan Patent Office on Jul. 8, 2014, the entire content of which is incorporated herein by reference.

TECHNICAL FIELD

The present disclosure relates to a wave power generation system and its motion control module, and more particularly, to a motion control module capable of varying its resonance frequency for enhancing power generating efficiency as well as a wave power generation system using the motion control module.

BACKGROUND

Generally, a common wave power generation system is composed of a buoy, a motion module, an expansion pipe, and a heavy plate in a manner that the expansion pipe is coupled to a top of the heavy plate, the motion module is coupled to a top of the expansion pipe while allowing a top of the motion module to be disposed boring through and connected to the buoy, and the buoy is provided for a power generation module to be disposed therein. In addition, the assembly of the buoy and the motion module can be referred as an upper floating body, while allowing the assembly of the heavy plate and the expansion pipe to be referred as a lower floating body.

Moreover, the heavy plate is usually tied by a number of cables for enabling the heavy plate to be fixed and submerged under the ocean surface, whereas each of the cables can be a steel wire rope, an artificial fiber rope or an iron chain. As a portion of the buoy is floating above the ocean surface while allowing the upper floating body to be treated as a relative stable end and the lower floating body to be treated as a relative moving end, and when there is a wave travelling passing through the wave power generation system, the upper floating body and the lower floating body are being driven to moved up and down relative to each other for bringing along the power generation module to rotate so as to generate electricity.

Clearly, a wave power generation system is substantially a vibration system that its power generating efficiency is varied with the variation of wave period. Thus, if resonance occurs in the wave power generation system when the wave period is equal to the natural frequency of the wave power generation system, the power generating efficiency of the wave power generation system. On the other hand, when wave period is far from the specific resonance area of the wave power generation system, its power generating efficiency will drop significantly. Therefore, it is in need of a wave power generation system that is designed with a larger resonance area of high power generating efficiency for allowing more wave energy to be harvested thereby.

SUMMARY

The present disclosure provides a wave power generation system, which comprises:
  a heavy plate;
  an expansion pipe, installed on a top of the heavy plate;
  a motion module, installed on a top of the expansion pipe;
  a buoy, installed on a top of the motion module in a manner that a top end of the motion module is disposed passing through the buoy, while allowing the top end to be connected to the buoy; and
  a motion control module, further comprising:
    a base, installed in the heavy plate;
    a driving unit, installed in the base; and
    a plurality of blades, coupled to the driving unit.

In an embodiment, the prevent disclosure provides a motion control module that is adapted for a wave power generation system, which comprises:
  a base, installed in the heavy plate;
  a driving unit, installed in the base; and
  a plurality of blades, coupled to the driving unit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
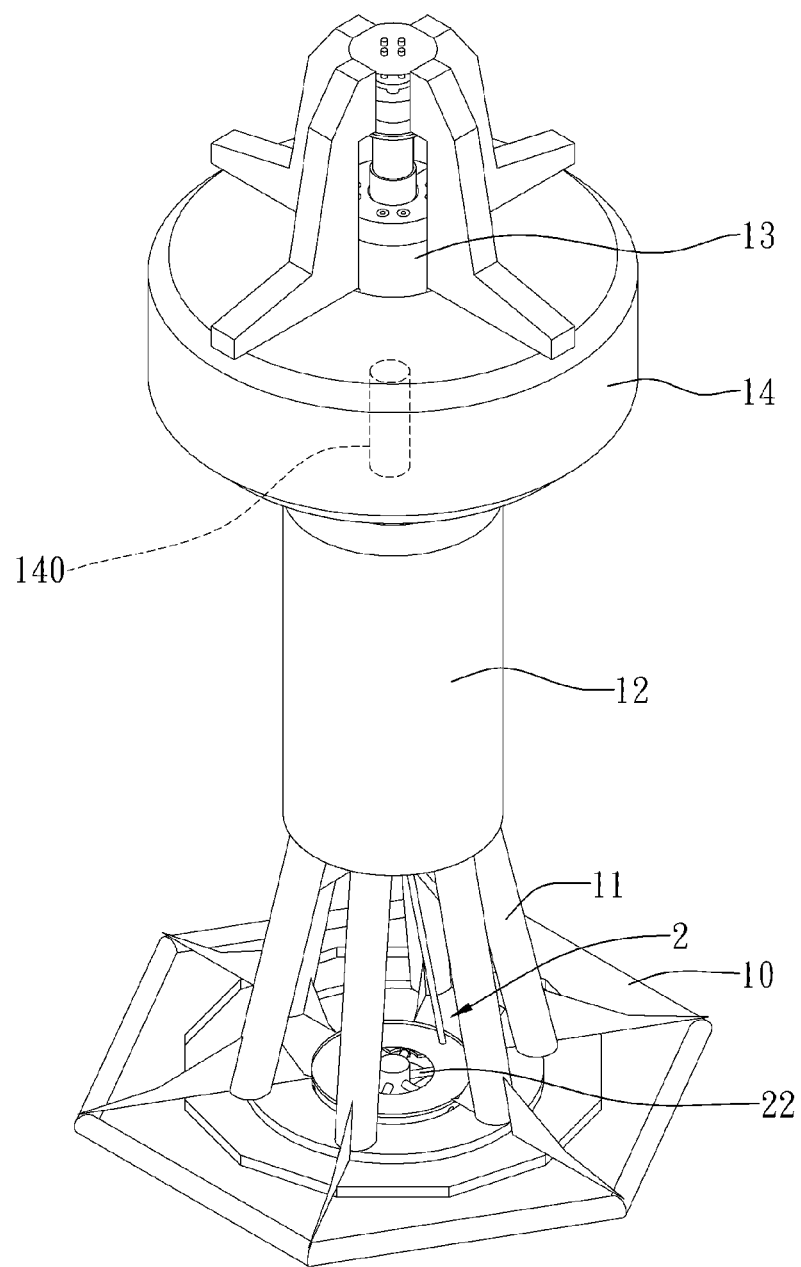
FIG. 1 is a three dimensional view of a wave power generation system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a three dimensional view of a wave power generation system according to the present disclosure. In FIG. 1, a wave power generation system is disclosed, which comprises: a heavy plate 10, a plurality of junction pipes 11, an expansion pipe 12, a motion module 13, a buoy 14 and a motion control module 2. In addition, the assembly of the heavy plate 10, the plural junction pipes 11 and the expansion pipe 12 is referred as a lower floating body that is fixed and submerged under the ocean surface by cables.

Figure 2:
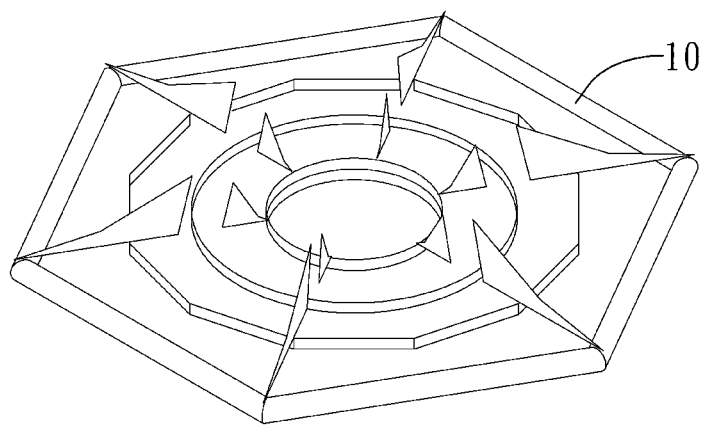
FIG. 2 is a three dimensional view of a heavy plate according to the present disclosure.

Please refer to FIG. 2, which is a three dimensional view of a heavy plate according to the present disclosure. In FIG. 2, the plural junction pipes 11 are connected to the top of the heavy plate 10 respectively by one end thereof, while allowing another end thereof that is not connected to the heavy plate 10 to be connected to one end of the expansion pipe 12. Moreover, one end of the motion module 13 is connected to the other end of the expansion pipe 12 that is not connected to the junction pipes 11 while allowing another end of the motion module 13 to be arranged boring through and coupled to the buoy 14. In addition, the buoy 14 further comprises a power generation module 140 that is received inside the buoy 14.

Figure 3:
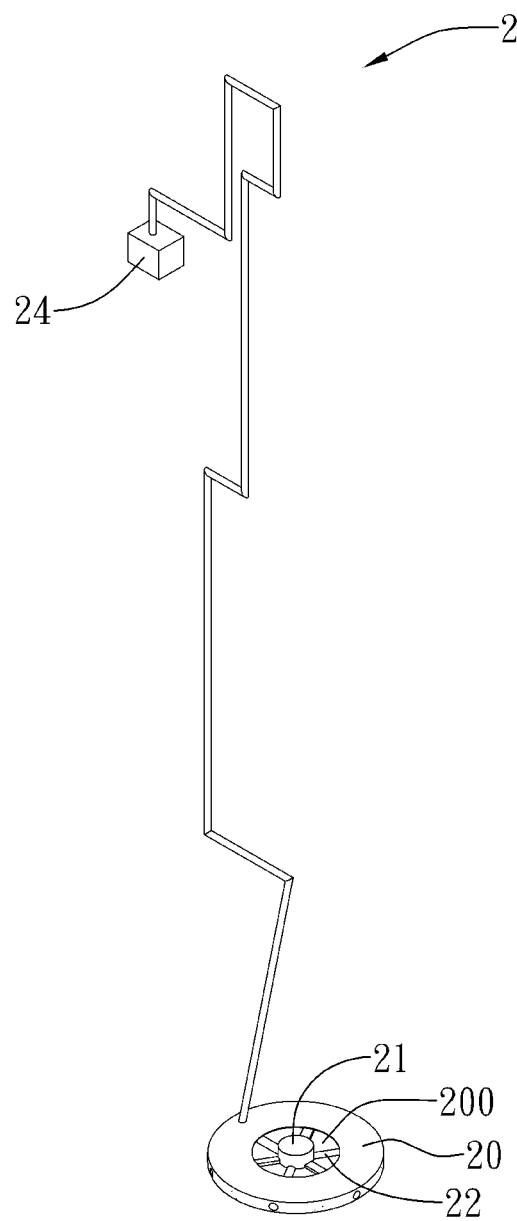
FIG. 3 is a three dimensional view of a motion control module according to the present disclosure.
Figure 4:
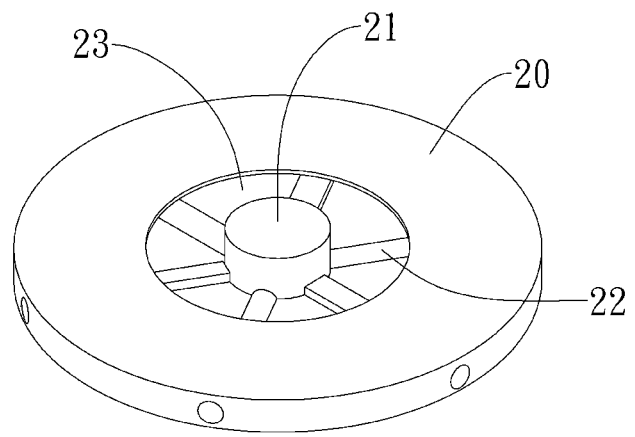
FIG. 4 is a three dimensional diagram showing a base of a motion control module as its via hole is closed by the blades.
Figure 5:
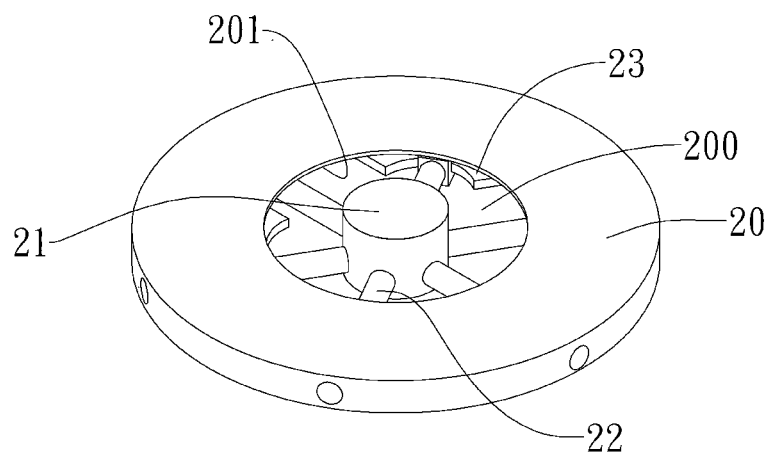
FIG. 5 is a three dimensional diagram showing a base of a motion control module as its via hole is opened.

With respect to FIG. 3, FIG. 4 and FIG. 5, the motion control module 2 comprises: a base 20, a driving unit 21, a plurality of driving rods 22, a plurality of blades 23 and a control unit 24.

The base 20 is disposed on the heavy plate 10 and is formed with a via hole 200, whereas the via hole can be a circular hole or a polygonal hole. Moreover, the via hole 200 has a plurality of receiving slots 201 formed on the inner rim thereof in a manner that the via hole 200 and the plural receiving slots 201 are concentrically formed.

Figure 6:
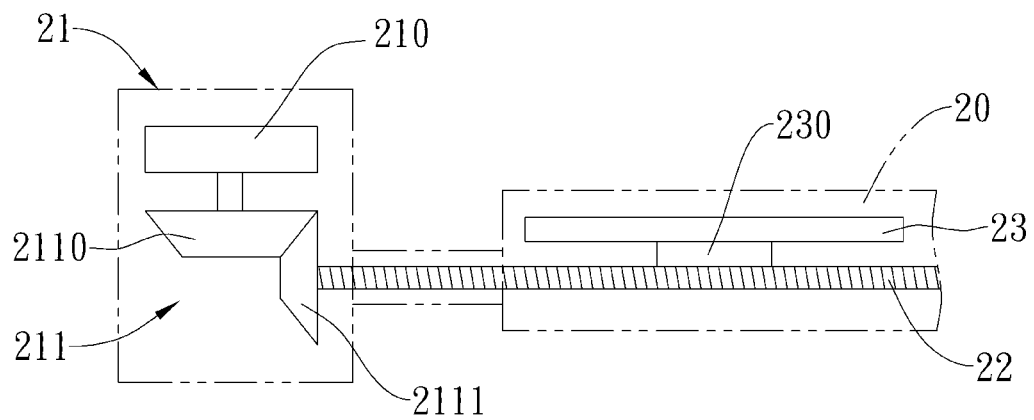
FIG. 6 is a schematic diagram showing a regional motion relating to a driving unit, a blade and a driving rod in the present disclosure.

The driving unit 21 is disposed on the base 20. In this embodiment, the driving unit 21 is fixed to the via hole 200, but is not limited thereby. A shown in FIG. 6, the driving unit 21 has a driving element 210 and a gear set 211.

The driving element 210 can be a motor, a hydraulic cylinder or a pneumatic cylinder. The gear set 211 is composed of a main gear 2110 and a plurality of pinions 2111. The main gear 2110 is arranged engaging to the driving element 210, whereas the main gear 2110 can be a helical gear or a bevel gear. The plural pinions 2111 are arranged engaging to the main gear 2110, whereas each of the plural pinions 2111 can be bevel gear.

For each of the plural driving rods 22, it is disposed on the base 20 while allowing one end thereof to extend in a direction toward the driving unit 21 so as to coupled to one corresponding pinion 2111. In one embodiment of the present disclosure, the driving rod 22 can be a screw rod.

For each of the plural blades 23, one side thereof that is positioned facing toward the corresponding driving rod 22 is formed with a pull element 230, that is to be used for coupling the blade 23 to its corresponding driving rod 22 so as to be brought along to move. In one embodiment of the present disclosure, the pull element 230 can be a gear rack capable of meshing to the driving rod 22 when the driving rod 22 is a screw rod.

The control unit 24 that is disposed on the buoy 14, is connected to the driving element 210 for allowing signal transmission therebetween. In a condition when the driving unit 210 is a motor, the control unit 24 can be connected to the driving element 210 electrically. However, in a condition when the driving element 210 is a hydraulic cylinder, the control unit 24 shall be connected to the driving element 210 by tubes so as to force a hydraulic pressure to the driving element 210 or recover a hydraulic pressure from the driving element 210. Moreover, in a condition when the driving element 210 is a pneumatic cylinder, the control unit 24 is similarly connected to the driving element 210 by tubes so as to force a pneumatic pressure to the driving element 210 or recover a pneumatic pressure from the driving element 210. Accordingly, the driving element 210 can be activated either electrically or by pressure.

As shown in FIG. 3 to FIG. 6, the control unit 24 is used for controlling the driving unit 21 for activating the blades 23 to move relative to the via hole 200 for closing or opening the via hole 200. For instance, when the driving element 211 is activated by the control unit 24, the main gear 2110 and the pinion 2111 are enabled to rotate, bringing along the driving rods 22 to rotate accordingly, and thus by the engagement between the pull element 230 and the driving rods 22, enabling the blades 22 to move relative to the via hole 200 for closing or opening the via hole 200.

Moreover, the heavy plate 10 is usually tied by a number of cables for enabling the heavy plate to be fixed and submerged under the ocean surface. As a portion of the buoy 14 is floating above the ocean surface and when there is a wave travelling passing through the buoy 14, the buoy 14 will be driven to moved up and down relative to the motion module 13, consequently enabling the power generation module 140 inside the buoy 14 to generate electricity.

With respect to the location where the wave power generation system of the present disclosure is disposed, the wave period at that location can be shorter or longer at different months or seasons. In response, the wave power generation system of the present disclosure further comprises a motion control module 2, that is disposed on the heavy plate 10 for controlling the diameter of the via hole 200 on the heavy plate 10 when the via hole 200 is being driven to open, and thus controlling the resonance frequency of the wave power generation system to be varied accordingly for matching to the different wave periods of different months or seasons, so that the resonance of the wave power generation system can be optimized for achieving higher power generating efficiency.

Figure 7:
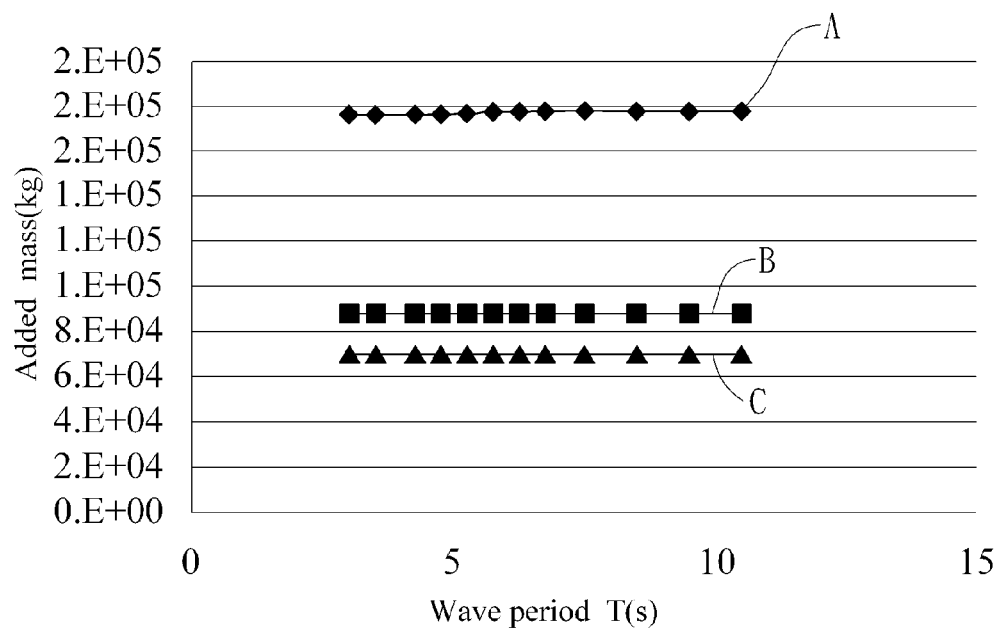
FIG. 7 is a diagram showing the relationship between added mass and wave period in the present disclosure.

Please refer to FIG. 7, which is a diagram showing the relationship between added mass and wave period in the present disclosure. As shown in FIG. 7, the added mass of the lower floating body can be affected by the opening of the via hole 200. For instance, as indicated by the curve A in FIG. 7, when the via hole 200 is closed, the added mass is at its maximum.

On the other hand, as indicated by the curve B in FIG. 7 that a portion of each of the blades 23 is received inside its corresponding receiving slot 201, enabling the via hole 200 to open with a diameter of 3 m. i.e. the via hole 200 is opened to a first specific range, the added mass of curve B is smaller that that of curve A.

In addition, as indicated by the curve C in FIG. 7 that the via hole 200 is opened with a diameter of 5 m. i.e. the via hole 200 is opened to a second specific range that is larger than the first specific range, the added mass of curve C is smaller that that of curve B.

According to the above description, the added mass of the lower floating body can be affected by the opening of the via hole 200, which can further change the natural frequency of the wave power generation system of the present disclosure.

Figure 8:
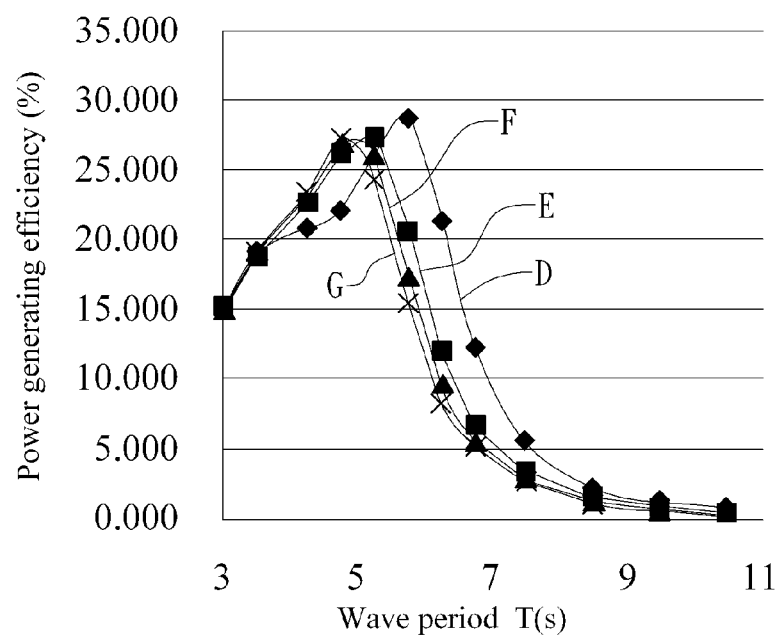
FIG. 8 is a diagram showing the relationship between power generating efficiency and wave period in the present disclosure.

Please refer to FIG. 8, which is a diagram showing the relationship between power generating efficiency and wave period in the present disclosure. In FIG. 8, curve D represents a condition that the via hole 200 is closed, which enables a resonance period of 5.75 sec with a corresponding power generating efficiency of 28.64%. Thus, for enabling the wave power generation system to have a power generating efficiency that is larger than 25%, the wave period should be ranged between 5.2 sec and 6 sec.

Moreover, curve E represents a condition that that via hole 200 is opened with a diameter of 3 m as represented by the curve B in FIG. 7, which enables a resonance period of 5.25 sec with a corresponding power generating efficiency of 27.29%. Thus, for enabling the wave power generation system to have a power generating efficiency that is larger than 25%, the wave period should be ranged between 4.6 sec and 5.5 sec.

Curve F represents a condition that that via hole 200 is opened with a diameter of 4 m, which enables a resonance period of 4.75 sec with a corresponding power generating efficiency of 26.91%. Thus, for enabling the wave power generation system to have a power generating efficiency that is larger than 25%, the wave period should be ranged between 4.4 sec and 5.4 sec.

Curve G represents a condition that that via hole 200 is opened with a diameter of 5 m as represented by the curve C in FIG. 7, which enables a resonance period of 4.75 sec with a corresponding power generating efficiency of 27.26%. Thus, for enabling the wave power generation system to have a power generating efficiency that is larger than 25%, the wave period should be ranged between 4.4 sec and 5.2 sec.

Accordingly, the wave power generation system of the present disclosure is able to control and vary the diameter of its via hole so as to change its natural frequency for allowing the same to match with the different wave period at different months or seasons responsively, and consequently, enabling resonance to be optimized for achieving better power generating efficiency. In the present disclosure, the allowable wave period with power generating efficiency that is larger than 25% is ranged between 4.4 sec and 6 sec, indicating that the allowable band width for achieving high power generating efficiency is increased, and thus the capacity factor or the gross power generation of the power generation module inside the wave power generation system is enhanced.

In addition, the motion control module of the present disclosure can be configured with at least one base or a plurality of bases, whereas the at least one base or each of the plural bases can be arranged at any random position of the heavy plate.

The opening of the via hole with respect to its diameter is controlled by the blades, whereas the activation of the blades for controlling the open and close of the via hole is controlled by the driving unit. In addition, the driving unit can be activated by the control unit either electrically or by pressure, so that the plural blades can be driven to move relative to the via hole for controlling the opening/closing of the via hole in a stageless manner.

Therefore, the wave power generation system of the present disclosure is able to control and vary the diameter of its via hole so as to change its natural frequency for allowing the same to match with the different wave period at different months or seasons responsively, and consequently, enabling resonance to be optimized for achieving better power generating efficiency and thus enhancing gross power generation all year round.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A motion control module, for use in a wave power generation system with a heavy plate, said motion control module comprising:
    a base, installed in said heavy plate, said base comprising a via hole;
    a driving unit, installed in the base; and
    a plurality of blades, coupled to the driving unit,
    wherein the driving unit is configured to position said plurality of blades to adjustably close or open said via hole to change natural frequency of said wave power generation system to match wave periods of different months or seasons responsively, and consequently, enabling resonance to be optimized for achieving better power generating efficiency.

2. The motion control module of claim 1, wherein the via hole has a plurality of receiving slots formed on the inner rim thereof, and thereby, the plural blades are positioned respectively at spaces between the via hole and the plural receiving slots.

3. The motion control module of claim 2, wherein the via hole and the plural receiving slots are concentrically formed.

4. The motion control module of claim 1, wherein the driving unit is comprised of a driving element and a gear set, and the gear set further is composed of a main gear and a plurality of pinions in a manner that the plural pinions are arranged engaging with the main gear while the main gear is engaged with the driving element; the motion control module is further comprised of: a plurality of driving rods, and each of the plural driving rods is positioned for allowing one end thereof to face forward and extend toward the driving element and thus to be coupled to one corresponding pinion; and for each of the plural blades, one side thereof that is positioned facing toward the corresponding driving rod is formed with a pull element, that is to be used for coupling the blade to its corresponding driving rod so as to be brought along to move.

5. The motion control module of claim 4, wherein the driving element is a component selected from the group consisting of: a motor, a hydraulic cylinder and a pneumatic cylinder; the main gear is a gear selected from the group consisting of: a helical gear and a bevel gear; each of the pinions is substantially a bevel gear; each of the plural driving rods is substantially a screw rod; and the pull element is substantially a gear rack.

6. The motion control module of claim 4, wherein the motion control module further comprises a control unit, being connected to the driving element for allowing signal transmission therebetween.

* * * * *